United States Patent

[11] 3,569,732

[72] Inventor Alton O. Christensen
Houston, Tex.
[21] Appl. No. 884,848
[22] Filed Dec. 15, 1969
[45] Patented Mar. 9, 1971
[73] Assignee Shell Oil Company
New York, N.Y.

[54] INDUCTANCELESS IGFET FREQUENCY DOUBLER
8 Claims, 2 Drawing Figs.

[52] U.S. Cl. .......... 307/220, 307/260, 307/304, 321/69, 328/20
[51] Int. Cl. .......... H03k 21/00
[50] Field of Search .......... 307/205, 220, 225, 251, 260, 271, 279, 304; 328/16, 20, 38; 321/69 (NL), 69, 60; 330/35, 38 (FE)

[56] References Cited

UNITED STATES PATENTS

| | | | |
|---|---|---|---|
| 2,829,253 | 4/1958 | Shepard | 328/20 |
| 3,030,566 | 4/1962 | Collins | 307/220X |
| 3,093,752 | 6/1963 | Christensen | 307/260 |
| 3,202,840 | 8/1965 | Ames, Jr. | 307/225 |
| 3,333,180 | 7/1967 | Neu | 321/69 |
| 3,436,681 | 4/1969 | Hart | 307/304X |
| 3,461,312 | 8/1969 | Farber et al. | 307/251X |

OTHER REFERENCES

Pennebaker, Frequency Doubler, I.B.M. Technical Disclosure, Bulletin Vol. 7. No. 4., September 1964, p. 337. 307/225

*Primary Examiner*—Stanley T. Krawczewicz
*Attorneys*—J. H. McCarthy and Theodore E. Bieber

ABSTRACT: An IGFET frequency doubler is provided by connecting across a bias voltage source a two-gate output IGFET in series with one or more resistance-connected IGFET's. The two gates of the output IGFET are connected, respectively, to the source and drain electrodes of an input IGFET connected in series with, and between, a pair of resistance-connected IGFET's across the bias voltage source. By applying an alternating-current input signal to the gate electrode of the input IGFET, the "on" resistance of the input IGFET is varied. By proper choice of the operating points of the IGFET devices, any departure of the input IGFET "on" resistance in either direction from a predetermined center value results in a decrease of the "on" resistance of the output IGFET. Consequently, an output signal having double the frequency of the input signal appears at the junction between the output IGFET and the bias IGFET in series with it.

INVENTOR.
ALTON O. CHRISTENSEN
BY
Mellin, Moore & Weissenberger
ATTORNEYS

INDUCTANCELESS IGFET FREQUENCY DOUBLER

BACKGROUND OF THE INVENTION

Frequency doubler circuits are useful in many electronic applications. For example, such circuits are useful in creating second harmonics in musical instruments such as electronic organs and guitars. In the field of stereo broadcasting, a frequency doubler is commonly used for converting the 19 kilocycle subcarrier of the FM stereo signal into the 38 kilocycle left-right stereo switching frequency. The extremely small size of IGFET (insulated gate field effect transistor) circuitry is highly useful in the size and cost reduction of such instruments. Furthermore, conventional frequency doubler circuits usually contain inductive elements which limit the bandwidth of the signal whose frequency is to be doubled. IGFET circuitry is particularly useful for wideband applications as IGFET circuitry is inherently inductanceless.

SUMMARY OF THE INVENTION

The present invention takes advantage of the strongly nonlinear characteristics of IGFET's in the threshold region, and of the fact that an IGFET's "on" resistance varies within limits, in proportion to the potential applied to the gate electrode, to convert an alternating current having a first frequency into an alternating current output having twice that frequency.

It is therefore the primary object of the invention to provide an inductanceless IGFET circuit capable of doubling the frequency of an input signal over a wide bandwidth.

It is a further object of the invention to provide a frequency doubler of simple construction and featuring low-cost, low-power consumption and high reliability.

DESCRIPTION OF THE PREFERRED EMBODIMENT

Figure 1:
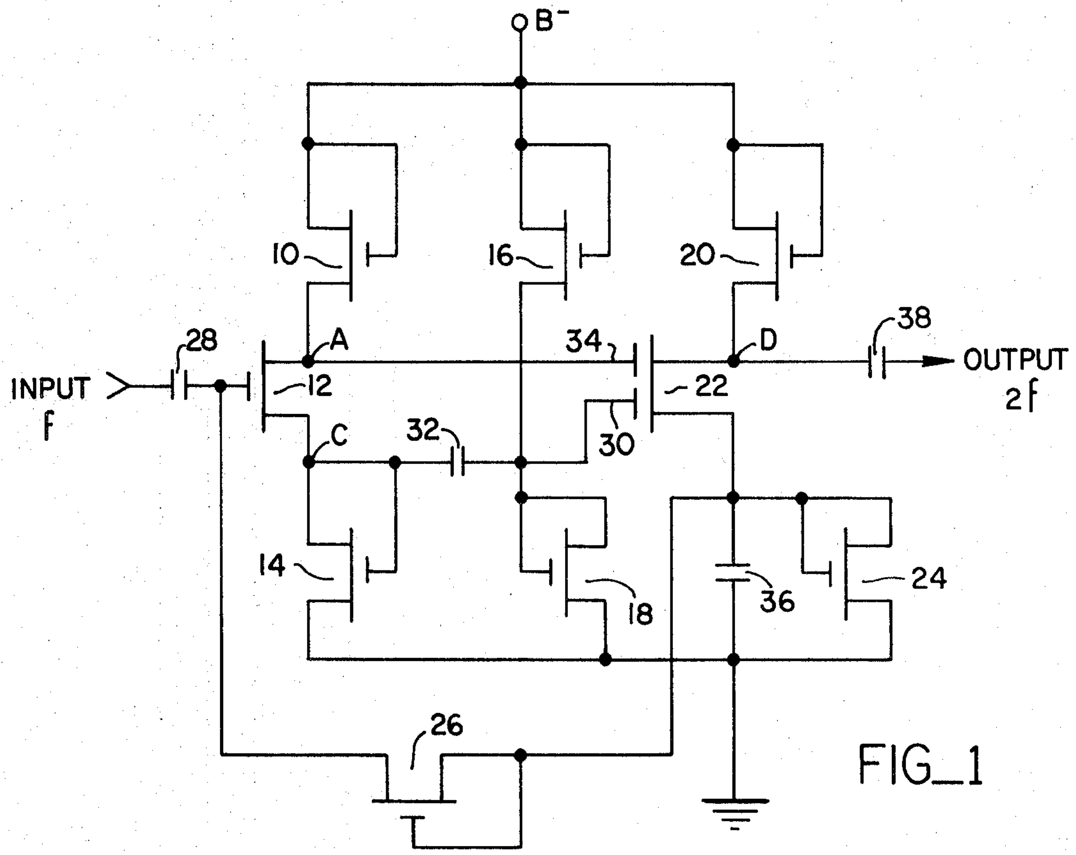
FIG. 1 shows the circuit of this invention.

As best shown in FIG. 1, the DC power provided by the bias source B– is distributed through three distinct voltage-dividing branches of the circuit. The first branch consists of bias IGFET's 10, 14, and input IGFET 12 connected in series; the second branch consists of IGFET's 16, 18 connected in series; and the third branch consists of bias IGFET's 20, 24 and output IGFET 22 connected in series.

The "on" resistances of the aforementioned IGFET's, and the DC bias voltage B–, are so proportioned that during the entire time of operation of the circuit, none of the gate electrode voltages ever drop significantly below threshold. Inasmuch as the gate electrode of IGFET 26 is connected to the same point as the gate electrode of bias IGFET 24, bias IGFET 26 is also permanently enabled and in turn permanently enables input IGFET 12.

The operation of the circuit relies upon the fact that the "on" resistance of an IGFET varies generally in direct proportion to the voltage applied to its gate electrode. When an alternating current signal of a base frequency *f* is applied through the isolating capacitor 28 to the gate electrode of input IGFET 12, the "on" resistance of input IGFET 12 will vary in proportion to the instantaneous signal amplitude of the input signal.

When the input signal to the gate electrode of input IGFET 12 increases beyond the predetermined center level established by the negative bias applied to the gate electrode of input IGFET 12 through bias IGFET 26, the "on" resistance of input IGFET 12 decreases. The decrease in the "on" resistance of input IGFET 12 causes the potential at point A to change toward ground potential, and the potential at point C to change toward B–.

With the DC bias point of the gate electrode 30 of output IGFET 22 being determined by the constant "on" resistance ratio of IGFET's 16 and 18, the voltage change at point C, transmitted to gate electrode 30 through isolating capacitor 32, causes the gate electrode 30 to go more negative. At the same time, the voltage change at point A causes the gate electrode 34 of output IGFET 22 to become less negative.

The output IGFET 22 is operated, for the purposes of this invention, in the nonlinear portion of its characteristic, i.e., near threshold. Consequently, the increase in bias on gate electrode 30 has a greater effect on the "on" resistance of output IGFET 22 than the decrease in bias on the gate electrode 34. As a result, the "on" resistance of output IGFET 22 decreases, and the output potential appearing at junction D becomes less negative. In order to increase the amplitude of the potential variation at the point D, bypass capacitance 36 is provided to bypass IGFET 24 insofar as the output signal is concerned.

When the polarity of the input signal changes so as to drive the gate electrode of input IGFET 14 in the opposite direction from its normal bias point, the "on" resistance of input IGFET 12 increases, and the potentials at points A and C vary in the opposite direction. As a result, the gate 34 of output IGFET 22 will be driven more negative than its predetermined center value, whereas the gate 30 of output IGFET 22 will be driven less negative. Due to the operation of output IGFET 22 in the nonlinear portion of its characteristic, the effect of the voltage variation on gate 34 will predominate, and point D will once again be driven to a less negative potential than its normal potential in the absence of any input signal.

Figure 2:
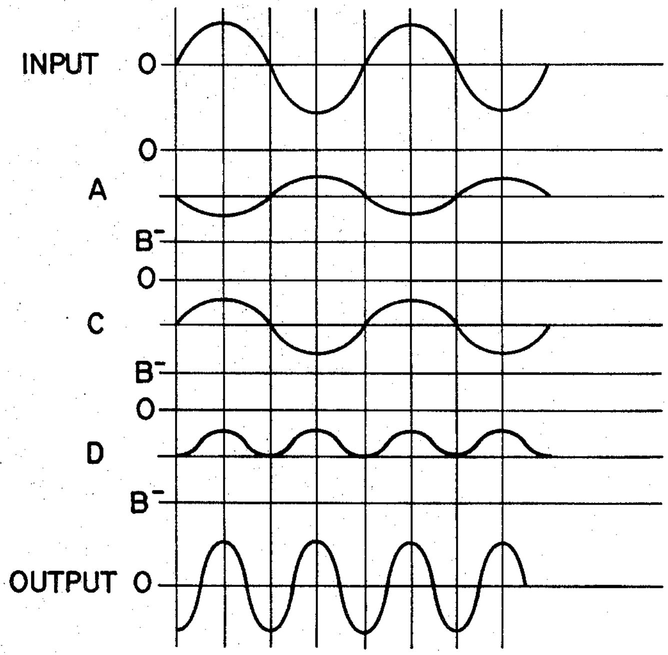
FIG. 2 is a time amplitude diagram illustrating the waveforms appearing at various points in the circuit of FIG. 1.

An examination of the time amplitude diagrams of FIG. 2 will readily show that the net effect of the circuit of FIG. 1 is to provide at the output terminal a signal having twice the frequency as that of the input signal.

Although it will be understood that the output signal at point D is superimposed upon a DC bias level determined by the relationship of bias IGFET's 20 and 24, the bias can be removed by an isolating capacitance 38 so that the output will be a pure alternating current signal of frequency 2*f*.

I claim:

1. An IGFET frequency doubler circuit, comprising:
   a. output IGFET means having a pair of gate electrodes and being arranged to reduce the total "on" resistance of their source-drain circuit in response to an increase in the gate potential on one of said gate electrodes beyond a predetermined value; and
   b. means responsive to an alternating current input signal for increasing the gate potential beyond said predetermined value on one of said gate electrodes when the instantaneous value of said alternating current signal is positive, and on the other of said gate electrodes when the instantaneous value of said alternating current signal is negative, said means including:
      i. a source of DC bias;
      ii. a first bias IGFET having its drain and gate electrodes connected to one side of said bias source, and its source electrode connected to said one of said output IGFET gate electrodes;
      iii. an input IGFET having its gate electrode connected to said input signal, its drain electrode connected to the source electrode of said first bias IGFET, and its source electrode connected to the other of said output IGFET gate electrodes; and
      iv. a second bias IGFET having its gate and drain electrodes connected to the source electrode of said input IGFET, and its source electrode connected to the other side of said bias source.

2. The circuit of claim 1, further including DC isolation means interposed in the connection between one of said source and drain electrodes of said input IGFET and the corresponding output IGFET gate electrode, and means for establishing a DC bias on that output IGFET gate electrode.

3. The circuit of claim 2, in which said DC bias-establishing means comprise a pair of resistance-connected IGFET's connected across said DC bias source.

4. The circuit of claim 1, further comprising means for establishing a DC bias on said gate electrode of said input IGFET.

5. The circuit of claim 1, in which the circuit parameters are such that said first and second bias IGFET and said input IGFET remain in an enabled condition throughout substantially the entire range of potential variation of said input signal.

6. The circuit of claim 1, further comprising third bias IGFET means whose source drain circuit is connected in series with the source drain circuit of said output IGFET for establishing a DC bias on one of the electrodes of the source drain circuit of said output IGFET.

7. The circuit of claim 1, in which said predetermined value is so chosen that the variations of gate potential in response to said input signal occur substantially in the nonlinear region of the response curve of said output IGFET means.

8. The circuit of claim 1, in which said output IGFET has a single source electrode and a single drain electrode but two gate electrodes.